United States Patent
Machin

(10) Patent No.: US 6,632,395 B1
(45) Date of Patent: Oct. 14, 2003

(54) STAINLESS STEELS

(75) Inventor: Trevor John Machin, Doncaster (GB)

(73) Assignee: The Village Partnership LLP, Sheffield (GB)

( * ) Notice: Subject to any disclaimer, the term of this patent is extended or adjusted under 35 U.S.C. 154(b) by 0 days.

(21) Appl. No.: 09/889,825

(22) PCT Filed: Jan. 20, 2000

(86) PCT No.: PCT/GB00/00120

§ 371 (c)(1),
(2), (4) Date: Jul. 23, 2001

(87) PCT Pub. No.: WO00/43562

PCT Pub. Date: Jul. 27, 2000

(30) Foreign Application Priority Data

Jan. 23, 1999 (GB) ............................................. 9901476
Jul. 10, 1999 (GB) ............................................. 9916172

(51) Int. Cl.$^7$ ........................... C22C 38/44; C22C 38/38
(52) U.S. Cl. .......................................... 420/46; 148/327
(58) Field of Search ................................ 420/46, 586.1; 148/327

(56) References Cited

U.S. PATENT DOCUMENTS 4,371,394 A * 2/1983 Henthorne et al. ........... 420/46

FOREIGN PATENT DOCUMENTS

| EP | 0 342 574 | 11/1989 |
| EP | 0 507 229 | 10/1992 |
| GB | 833 308 | 4/1960 |
| GB | 1 091 849 | 11/1967 |

OTHER PUBLICATIONS

"Metals & Alloys in the Unified Numbering System, 7$^{th}$ Edition," 1996, p. 270, Society of Automotive Engineering, Steel S34565.

C.R. Taylor et al., "Electric Furnace Steelmaking," 1985, pp. 143–148, 157–159, Iron & Steel Society.

H.E. McGannon, "The Making, Shaping and Treating of Steel," 1971, p. 256, United States Steel.

N. Arlt et al., "Welding Characteristics and Corrosion Resistance of the New Nitrogen–Alloyed Steel X 2 CrNiMnMoN 24 17 6 4," Welding International, Jan. 1, 1994, pp. 804–807, vol. 8, No. 10, Welding Institute, Abington, Great Britain.

C. Gillessen et al., "Development, Properties and Application of Conventionally Produced High–Nitrogen Austenitic Steels," 1991, pp. 412–420, vol. 62, No. 9, Steel Research.

R.Grundmann et al., "Properties of the newly developed steel X 2 CrNiMnMoN 23 17 6 4," 1990, pp. 19–24, vol. 41, No. 1, Werkstoffe und Korrosion.

M. Liljas, "Development of Superaustenitic Stainless Steels," Welding in the World Jun. 1, 1995, pp. 55–63, vol. 36, International Institute of Welding.

* cited by examiner

Primary Examiner—Deborah Yee
(74) Attorney, Agent, or Firm—Venable, LLP; Michael A. Sartori; Marina V. Schneller

(57) ABSTRACT

This invention relates to a high-strength, austenitic, stainless steel, and to a method of its production. A method of producing a high-strength, austenitic, stainless steel characterised by air-melting a feedstock of super austenitic stainless steel, introducing nitrogen at 1520° C. to 1540° C. by way of electrolytic manganese containing 6 wt % nitrogen, then low carbon ferro-chrome, adding boron when the other two alloys have been fully absorbed into the molten bath, allowing the bath to cool, casting the metal at 1480° C. to 1495° C., and subsequently subjecting the castings or metal to a solution heat-treatment at 1400° C. to 1160° C. A further aspect of the invention is a high-strength, austenitic stainless steel characterised by the following chemical composition by wt %:

| Carbon | 0.005 to 0.030 |
| Silicon | 0.03 to 1.00 |
| Manganese | 3.50 to 9.00 |
| Phosphorous | less than 0.025 |
| Sulphur | less than 0.01 |
| Chromium | 23.00 to 26.00 |
| Molybdenum | 4.00 to 6.00 |
| Nickel | 15.00 to 18.00 |
| Nitrogen | 0.50 to 1.10 |
| Balance | Fe |

A still further aspect of the invention is a weld rod or wire or a weld metal of the composition above definded.

13 Claims, No Drawings

STAINLESS STEELS

This invention relates to a high-strength, austenitic, stainless steel, and to methods of its production.

There is great use of austenitic stainless steels, especially in the petrochemical industry where their properties are essential. Ideal properties include high corrosion and pitting resistance, good weldability and elongation, good low-temperature impact resistance, high proof strength and high tensile strength.

These ideal metallurgical properties can be summarised as follows:

(a) PREN(=%Cr+3.3Mo+16 N)>50

(b) 0.2% proof strength=>400 N/mm$^2$ (c) critical pitting temperature >70° C.

(d) good weldability.

Such steels have been the object of much attention and research. Many attempts have been made to achieve all the properties listed but up to this time it was widely believed that they were basically incompatible, especially in the cast form, and could only be achieved to some acceptable degree in the wrought form.

A first object of the present invention is to provide a steelmaking/melting technique for the production of enhanced austenitic stainless steel where high levels of nitrogen can be achieved. A second object of the invention is to provide the ideal steel composition that will offer an austenitic structure giving all the required qualities already described. A third object of the invention is to provide the required welding materials and welding procedure for the steel.

According to a first aspect of the invention the method of producing the high-strength, austenitic, stainless steel defined above involves air-melting a feedstock of super austenitic stainless steel, introducing nitrogen at 1520° C. to 1540° C. by way of electrolytic manganese containing 6 wt % nitrogen, then introducing chromium in the form of low carbon ferro-chrome, adding a predetermined amount of boron when the other two alloys have been fully absorbed into the molten bath, allowing the bath to cool, casting the molten metal at 1480° C. to 1495° C., and subsequently subjecting the castings or metal to a solution heat-treatment at 1140° C. to 1160° C.

Alternatively, and according to a second aspect of the invention a method of producing the high-strength, austenitic stainless steel defined above involves air-melting a feedstock of CK3MCuN, adding pure manganese to the molten bath at between 1460° C. and 1495° C. to provide a Mn content of more than 5 wt %, introducing nitrogen to the bath in the form of nitrogen bearing ferro-chrome to bring the N content to over 0.5 wt % raising the bath temperature to 1540° C. to 1550° C. for tapping, casting the molten metal at 1520° C. to 1530° C., and subsequently subjecting the castings to a solution heat-treatment at 1140° C. to 1160° C.

The production of high-strength, austenitic stainless steel following the above melting method gives rise to two important phenomena; the A$^1$ line is depressed which in turn lowers the temperature at which total solid solution is achieved and the high manganese content markedly increases the solid solubility of nitrogen.

The liquidus temperature is similarly lowered in correspondence with the A$^1$ line. Thus high-strength austenitic stainless steel made in this manner can be poured at relatively low temperatures. No abnormalities in the flow of metal have been observed during casting, and castings with wall thicknesses as low as 15 mm–20 mm have been produced consistently.

Hitherto, the concern in the production of super austenitic stainless steels has been to ensure a low carbon content alongside high chromium and nickel contents to cause a delay in the precipitation of deleterious intermetallic phases. With the present invention it can be seen that intermetallics precipitate preferentially on existing Fe dendrite sites, which themselves are substantially depleted when tied up with nitrogen to form Fe$_2$N and Fe$_4$N, to allow the achievement of high nitrogen levels hitherto thought to be impossible.

According to a third aspect of the invention a high-strength, austenitic stainless steel has the following chemical composition by wt %:

| | |
|---|---|
| Carbon | 0.005 to 0.030 |
| Silicon | 0.03 to 1.00 |
| Manganese | 3.50 to 9.00 |
| Phosphorous | less than 0.025 |
| Sulphur | less than 0.01 |
| Chromium | 23.00 to 26.00 |
| Molybdenum | 4.00 to 6.00 |
| Nickel | 15.00 to 18.00 |
| Nitrogen | 0.50 to 1.10 |
| Balance Fe | |

Preferably, manganese is present in the range 5.00 to 7.50 wt %, nitrogen is present in the range 0.50 to 0.80 wt % and boron is present in the range 0.001 to 0.010 wt %.

Excellent properties of the steel are achieved where the nitrogen content is greater than 0.6 wt % and where the manganese content is greater than 6.0 wt %. A composition of the high-strength, austenitic stainless that can be regarded to be optimum is:

| Element | C | Si | Mn | S | P | Cr | Ni | Mo | N | B |
|---|---|---|---|---|---|---|---|---|---|---|
| wt % | 0.015 | 0.26 | 6.78 | 0.005 | 0.024 | 24.78 | 15.77 | 4.73 | 0.725 | 0.004 |

To achieve an optimum pitting resistance the chromium, molybdenum and nitrogen contents must reach the levels shown. At this composition (where nitrogen is greater than 0.7 wt %) pitting resistance equivalent numbers of greater than 50 are attained.

To provide a 0.2% proof stress over 400 N/mm$^2$ and a tensile strength of greater than 700 N/mm$^2$ manganese content must be over 5.0 wt % and preferably more than 6.0 wt %.

Nitrogen and manganese are strong austenite stabilisers. Their presence at these unusually high levels (when compared to currently available super austenitic stainless steels) promotes relatively fine grain formation in the alloy of the invention, improving weldability and low temperature impact properties. The presence of the non-metal boron complements the nitrogen addition, increasing the non-metallic properties of the metal. Another consequence of the alloy's properties is the enabling of the steelmaker or foundryman to tap and cast at lower temperatures.

Test pieces cast from the high-strength, austenitic stainless steel of the invention were subjected to tensile and Charpy impact tests with the following results:

Tensile test

|  | 0.2% proof strength N/mm² | Ultimate tensile strength N/mm² | Elongation | Hardness |
|---|---|---|---|---|
| Room temperature | 469 | 838 | 67 | 197 |
| +150° C. | 309 | 625 | 61 | — |
| +250° C. | 287 | 535 | 47 | — |

Charpy impact test

| Test temperature | Average impact energy (J) |
|---|---|
| Room temperature | 293 |
| −101° C. | 258 |
| −110° C. | 195 |
| −196° C. | 111 |

The following corrosion resistance tests were made:
(a) ASTM G48 method A at various high temperatures to determine the critical pitting temperature,
(b) ASTM G28 methods A and B at boiling temperatures (with sulphuric and mixed acid solutions respectively),
(c) NACE TM01 77-90 method C 30-day sulphide stress corrosion cracking test, and,
(d) ASTM G28 method B use of ocean water @ 22° C.

The results were astonishingly good. ASTM G48 method A testing in solution at 100° C. showed no weight loss or pitting and the actual critical pitting temperature was found to be 130° C. This is some 50° C. higher than previously found with similar alloys. The 30-day sulphide stress corrosion cracking test did not cause any cracking or failure at all. Similarly ocean water testing at 22° C. could not find any detectable level of corrosion.

Intermetallic phases, (sigma/chi), and second phase precipitates seriously weaken corrosion resistance and impact strength. In earlier tests we showed that 1% of sigma/chi within the microstructure reduces impact strength by 50%. Intermetallic phases precipitate within ferrite grains. Second phase precipitates occur predominantly at grain boundary positions associated with austenite grains. When produced to its optimum condition the alloy of the invention displays a fully stable austenitic structure micro-alloyed with manganese, nitrogen and boron, the latter two elements being interstitially distributed within the face centred cubic lattice in the form of $Fe_4N$, $Fe_2N$ and iron borax. The fine addition of boron to the level shown maximises interstitial density, further enhancing the austenite structure and increasing its immunity to deleterious intermetallic phases. The prevention of any intermetallic phases optimises corrosion resistance to levels on a par with titanium and considerably better than those seen in nickel alloys such as Inconel 600 and 625, Incoloy 825 and Hastalloy C-276. Another important benefit of the sub-microscopic interstitial elements (N and B) is that together they combine to create a full electron shell. This complete combination results in an even more densely packed lattice. It is well known to steelmakers that such stable states can only be achieved by the most precise use of elements of low relative atomic mass. If used incorrectly such elements will cause "shear" or "slip" and the steel will lose its cohesion and mechanical strength. However, used correctly as in the invention, this method of alloying, using low atomic mass non-metals, ensures that second phase eutectics do not occur because the preferential sites for embrittlement nucleation are fully combined with the non-metal additions.

In order to achieve solubility of non-metallic interstitials, whether in solid or gaseous state, a known energy must be applied to provide networking/bonding. The change in energy (enthalpy) together with the change in state from gas to solid (entropy) determines the temperature (ie the force) at which atomic lattice transfer will take place. The temperature of this process of this invention has been calculated to be 1523° C. or as expressed in the free energy equation 1796° K.

As well as enhancing interstitial density and optimising austenitic structure the fine addition of boron is essential where there is a requirement for the material of the invention to be forged, rolled or drawn. Fully austenitic materials should be forged or rolled between 950° C. and 1220° C. However, it is well known that high levels of nitrogen, such as are present in the invention, decrease hot ductility. This is due to the rigidity of the lattice formed by the sub-microscopic interstitial particles at high temperatures. Hot rupture during material deformation can result caused by intergranular failure. The precise addition of boron at 0.003–0.004% wt acts to toughen the lattice and minimise intergranular failure. At this level of addition boron is readily drawn into solid solution and essentially works as a solid solution strengthener counteracting the negative ductility effect of the nitrogen addition. Nevertheless care must still be taken during hot working, particularly in respect of temperature control, control of geometric change and the rate of section reduction.

According to a fourth aspect of the invention a welding rod or wire comprises an austenitic stainless steel of the chemical composition by wt %:

| | |
|---|---|
| Carbon | 0.005 to 0.030 |
| Silicon | 0.03 to 1.00 |
| Manganese | 3.50 to 9.00 |
| Phosphorous | less than 0.025 |
| Sulphur | less than 0.01 |
| Chromium | 23.00 to 26.00 |
| Molybdenum | 4.00 to 6.00 |
| Nickel | 15.00 to 18.00 |
| Nitrogen | 0.50 to 1.10 |
| Balance Fe | |

Preferably, manganese is present in the range 5.00 to 7.50 wt %, nitrogen is present in the range 0.50 to 0.80 wt % and boron is present in the range 0.001 to 0.010 wt %.

Weld metal formed when using a welding rod or wire as defined above has all of the attributes hereinbefore described.

Alternatively, a weld metal of the composition defined above, may be formed by providing a weld rod or wire comprising some of the elements required in the weld metal and the remainder in the flux employed during the welding process. Thus, a weld rod or wire may comprise carbon, silicon, phosphorous, sulphur, chromium, nickel and boron, and the co-operating flux may contain manganese, molybdenum, nitrogen and iron, in amounts wt % such that a weld metal formed comprises the element in the amounts previously defined.

Weld tests in accordance with ASME 1x and ASTM A488/A488M have been made to test this aspect of the invention. 40 mm thick double-V butt test plates were used. The welding position was 1G. On melting a welding rod in accordance with the invention a manganese-rich, molten pool is produced to maximise the solid solubility of nitrogen,

| Element | C | Si | Mn | S | P | Cr | Ni | Mo | N | B |
|---|---|---|---|---|---|---|---|---|---|---|
| Wt % | 0.015 | 0.26 | 6.78 | 0.005 | 0.024 | 24.78 | 15.77 | 4.73 | 0.725 | 0.004 | which itself is released from the flux in a secondary action and taken into the molten pool. Accurate matching of the alloys of the welding rod and the test plates minimises dilution. As the invention requires relatively low heat input energies it is easy to avoid weld cracking while still obtaining good fusion continuity.

A test weld was subjected to physical and mechanical tests as stipulated by ASME 1x with the following results:

| Ultimate tensile strength N/mm² | Charpy impact test at −101° C. (J) average | | | |
|---|---|---|---|---|
| | Weld centre line | Heat affected zone | Fusion line + 2 mm | Fusion line + 5 mm |
| 659,672 | 103 | 139 | 223 | 209 |

Corrosion test G48 method A at +50° C. and microscopical examination across the full weld gave excellent results. To prove this aspect of the invention further and completely four 180° 4t bend tests were carried out. These four tests demonstrated the weld material's excellent ductility.

What is claimed is:

1. A high-strength, austenitic stainless steel characterised by the following chemical composition by wt %:

| | | |
|---|---|---|
| | Carbon | 0.005 to 0.030 |
| | Silicon | 0.03 to 1.00 |
| | Manganese | 3.50 to 9.00 |
| | Phosphorous | less than 0.025 |
| | Sulphur | less than 0.01 |
| | Chromium | 23.00 to 26.00 |
| | Molybdenum | 4.00 to 6.00 |
| | Nickel | 15.00 to 18.00 |
| | Nitrogen | greater than 0.6 |
| | Boron | 0.003 to 0.004, and |
| | Balance | Fe. |

2. A high-strength, austenitic stainless steel as in claim 1, characterised in that nitrogen content is greater than 0.7% wt.

3. A high-strength, austenitic stainless steel as in claim 1, characterised in that nitrogen content is in the range of 0.6 to 1.1% wt.

4. A high-strength, austenitic stainless steel as in claim 1, characterised in that nitrogen content is in the range of 0.6 to 0.8% wt.

5. A high-strength, austenitic stainless steel as in claim 1, characterised in that nitrogen content is in the range of 0.7 to 0.8% wt.

6. A high-strength, austenitic stainless steel as in claim 1, characterised in that nitrogen content is 0.725% wt.

7. A high-strength, austenitic stainless steel as in claim 1, characterised in that manganese content is greater than 6% wt.

8. A high-strength, austenitic stainless steel as in claim 1, characterised in that manganese content is in the range of 5.0 to 7.5% wt.

9. A high-strength, austenitic stainless steel characterised by the following chemical composition by wt %:

10. A high-strength, austenitic stainless steel as in claim 1, characterised in that the steel has a pitting resistance equivalent number of greater than 50.

11. A high-strength, austenitic stainless steel as in claim 1, characterised in that there is a manganese content of over 5 wt % whereby to provide a 0.2% proof stress over 400 N/mm² and a tensile strength of over 700 N/mm².

12. A welding rod or wire comprising an austenitic stainless steel characterised by the following chemical composition by wt %:

| | | |
|---|---|---|
| | Carbon | 0.005 to 0.030 |
| | Silicon | 0.03 to 1.00 |
| | Manganese | 3.50 to 9.00 |
| | Phosphorous | less than 0.025 |
| | Sulphur | less than 0.01 |
| | Chromium | 23.00 to 26.00 |
| | Molybdenum | 4.00 to 6.00 |
| | Nickel | 15.00 to 18.00 |
| | Nitrogen | 0.5 to 1.10 |
| | Boron | 0.003 to 0.004, and |
| | Balance | Fe |

13. A welding rod or wire comprising an austenitic stainless steel characterised by the following chemical composition by wt %:

| | | |
|---|---|---|
| | Carbon | 0.005 to 0.030 |
| | Silicon | 0.03 to 1.00 |
| | Manganese | 3.50 to 9.00 |
| | Phosphorous | less than 0.025 |
| | Sulphur | less than 0.01 |
| | Chromium | 23.00 to 26.00 |
| | Molybdenum | 4.00 to 6.00 |
| | Nickel | 15.00 to 18.00 |
| | Nitrogen | 0.5 to 1.10 |
| | Balance | Fe | and boron, wherein the ratio of boron:nitrogen is less than 0.00625:1 wt %.

* * * * *